(12) United States Patent
Hoefflin

(10) Patent No.: US 8,545,956 B2
(45) Date of Patent: Oct. 1, 2013

(54) EXPANDABLE INSERT WITH FLEXIBLE SUBSTRATE

(75) Inventor: Frank Hoefflin, Royal Oak, MI (US)

(73) Assignee: Sika Technology AG, Baar (CH)

( * ) Notice: Subject to any disclaimer, the term of this patent is extended or adjusted under 35 U.S.C. 154(b) by 373 days.

(21) Appl. No.: 12/767,096

(22) Filed: Apr. 26, 2010

(65) Prior Publication Data
US 2011/0262735 A1  Oct. 27, 2011

(51) Int. Cl.
*B62D 25/00* (2006.01)
(52) U.S. Cl.
USPC .............................. 428/55; 428/56; 428/212
(58) Field of Classification Search
USPC ............. 428/55, 56, 212, 316.6; 296/187.02; 52/309.9
See application file for complete search history.

(56) References Cited

U.S. PATENT DOCUMENTS

| | | | |
|---|---|---|---|
| 4,898,630 A * | 2/1990 | Kitoh et al. | 156/79 |
| 6,103,341 A | 8/2000 | Barz et al. | |
| 6,358,584 B1 * | 3/2002 | Czaplicki | 428/36.5 |
| 6,519,854 B2 * | 2/2003 | Blank | 29/897.1 |
| 2008/0075864 A1 * | 3/2008 | Billotto et al. | 427/373 |

FOREIGN PATENT DOCUMENTS

| | | |
|---|---|---|
| DE | 2519484 A1 | 11/1976 |
| DE | 9102039 U1 | 5/1991 |
| WO | WO-02/36338 A1 | 5/2002 |
| WO | WO-2009/049886 A1 | 4/2009 |

OTHER PUBLICATIONS

International Search Report for PCT/EP2011/056547 dated Aug. 12, 2011.

* cited by examiner

*Primary Examiner* — Alexander Thomas
(74) *Attorney, Agent, or Firm* — Harness, Dickey & Pierce, PLC

(57) ABSTRACT

An expandable insert assembly, method of making the same, and a vehicle structure are disclosed. A structure may include a wall defining at least a portion of a cavity, with the wall including an installation surface for the insert. The insert may include a substrate configured to be secured to the installation surface, with the substrate having a stiffness allowing the substrate to deflect relative to an initial shape. The insert further includes a plurality of discrete expandable elements secured to the substrate adjacent the installation surface. Each of the discrete expandable elements are formed of an expandable material and are secured to the substrate such that they do not affect the stiffness of the substrate prior to expansion of the expandable elements.

23 Claims, 5 Drawing Sheets

EXPANDABLE INSERT WITH FLEXIBLE SUBSTRATE

BACKGROUND

Expandable inserts are commonly employed for improving acoustic or structural qualities of automobiles. Typically, an expandable material is placed within a cavity of a vehicle body, and expanded, such as by applying heat, during the vehicle manufacturing process to fill a portion of the cavity. Expandable materials may expand into a foam material effective for absorbing vibration or abating noise transmitted through the body structure. Other expandable materials may become extremely stiff after expansion to increase the overall stiffness or strength of the body structure.

Expandable materials are often formed on a carrier to form an insert or baffle assembly that is secured within a vehicle. Typically, mechanical fasteners or adhesives are used to secure the assembly, for example, in a cavity of a vehicle body structure. However, any complexities or undulations in the cavities may cause difficulties in the installation of baffle assemblies, and may also present challenges in the design of expandable materials to appropriately expand within the cavities. For example, carriers are typically formed of relatively stiff material to generally support the expandable materials formed thereon, and may be difficult to properly align with an intended surface within a cavity if even slightly out of conformance with designed tolerances. Further, it may be difficult or impossible to precisely form expandable materials in a shape accurately mimicking that of the structure or cavity into which the assembly is installed. The expandable insert assembly therefore may not properly seal about each intended surface of a particular cavity or structure, decreasing the effectiveness of the baffle assembly at minimizing the transmission of noise or vibration through the cavity or structure.

Accordingly, there is a need in the art for an expandable baffle design that allows for simplified and accurate installation while also providing adequate expansion and/or filling of an intended structure or cavity, especially irregularly shaped cavities.

BRIEF DESCRIPTION OF THE DRAWINGS

While the claims are not limited to the illustrated examples, an appreciation of various aspects is best gained through a discussion of various examples thereof. Referring now to the drawings, a variety of examples are shown in detail. Although the drawings represent the various illustrations, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Reference in the specification to "one illustration," "an illustration," "one embodiment," "an embodiment," etc., means that a particular feature, structure, or characteristic described in connection with the embodiment is included in at least one example or embodiment. The appearances of the phrase "in one example" in various places in the specification are not necessarily all referring to the same illustration.

According to various exemplary illustrations described herein, an expandable insert, e.g., a baffle assembly, reinforcer, or the like, is disclosed. Additionally, exemplary methods of making an expandable insert and exemplary vehicle structures are provided. A structure may include a wall defining at least a portion of a cavity, with the wall including an installation surface for the baffle. The expandable insert may include a substrate configured to be secured to the installation surface, with the substrate having a stiffness allowing the substrate to deflect relative to an initial shape. The expandable insert further includes a plurality of discrete expandable elements secured to the substrate adjacent the installation surface. Each of the discrete expandable elements are formed of an expandable material and are secured to the substrate such that they do not affect, e.g., increase, the stiffness of the substrate prior to expansion of the expandable elements.

A method of forming an expandable insert generally includes providing a substrate configured to allow selective deflection of the substrate, and applying a plurality of discrete expandable elements to the substrate. Each of the discrete expandable elements are formed of an expandable material. The method may further include establishing a substrate stiffness that remains generally constant before and after the plurality of discrete expandable elements are applied to the substrate.

Figure 1:
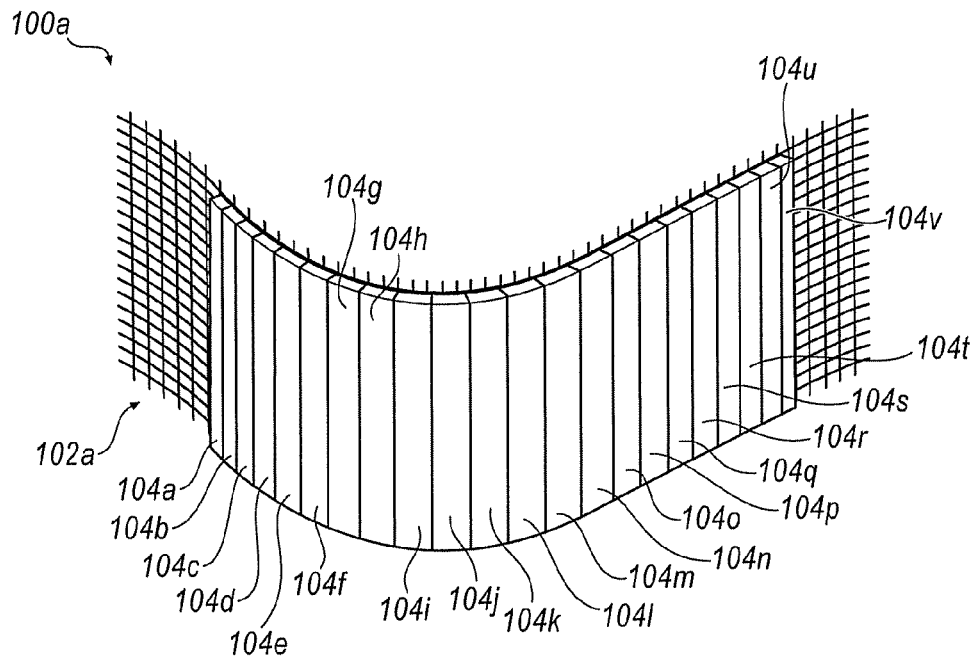
FIG. 1 is an isometric view of an expandable insert for a cavity having a plurality of discrete elements formed of expandable material, shown prior to expansion.
Figure 2A:
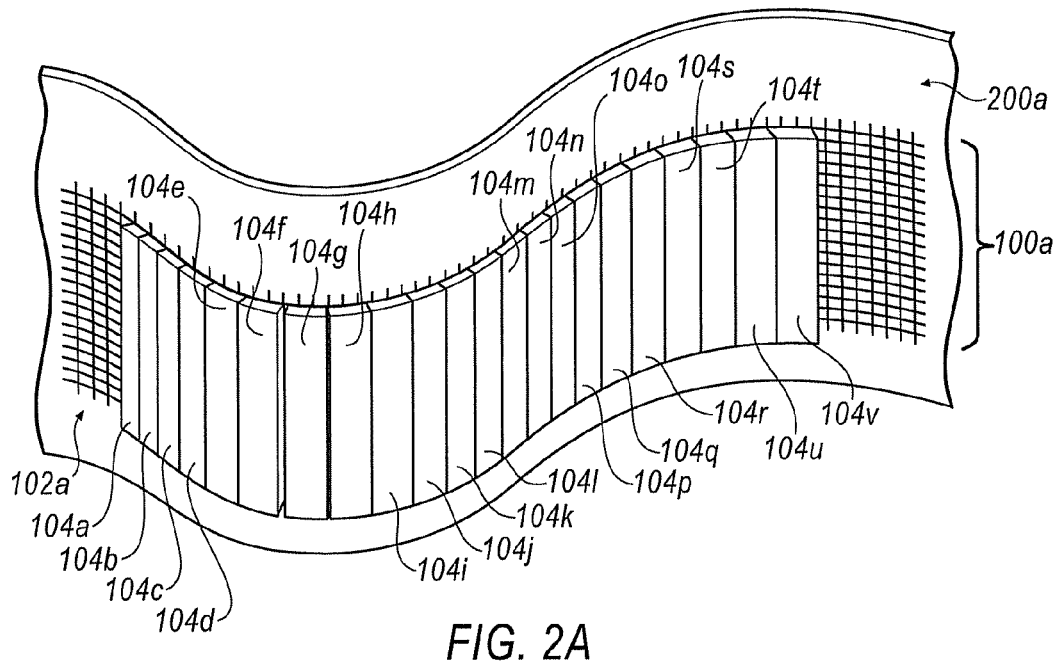
FIG. 2A is an isometric view of the expandable insert of FIG. 1 installed onto a panel with a generally curved or undulating surface.
Figure 2B:
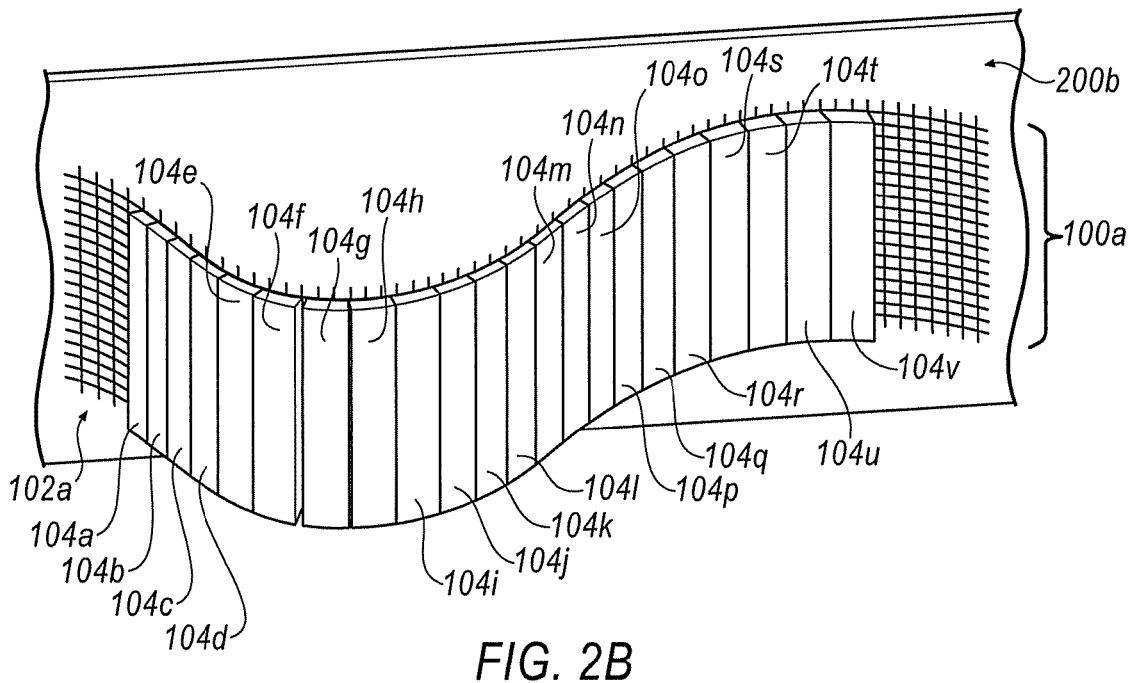
FIG. 2B is an isometric view of the expandable insert of FIG. 1 installed onto a panel with a generally straight or planar surface.

Turning now to FIGS. 1, 2A, and 2B, an expandable insert 100a is shown. Expandable insert 100a includes a substrate 102a, and a plurality of discrete expandable elements 104. Substrate 102a may be, for example, any heat resistant tape or mesh material that may be applied to various panels or structures. In one exemplary illustration, the substrate 102a is a heat resistant material that is generally stable at elevated temperatures, such as may be present in automotive paint bake ovens, thereby allowing placements of the substrate 102a in a vehicle structure prior to the structure's exposure to the elevated temperatures typical of such applications. Substrate 102a may thus be any variety of plastic, metal or fabric substrates that are convenient for securing to a panel or structure.

Substrate 102a may be generally flexible or pliable, such that it may be fitted to contours of a cavity surface or panel. For example, as shown in FIG. 2A, substrate 102a is a mesh tape that is secured to a panel 200*a* such that the substrate 102*a* generally mimics a general overall shape of panel 200*a*.

Alternatively, the substrate 102*a* may be installed such that it defines a different shape than the panel 200. For example, as shown in FIG. 2B, the substrate 102*a* may be secured to the panel 200 in a bent or deflected orientation such that the substrate 102*a* protrudes away from the panel 200 and into the cavity. More specifically, the panel 200*b* in FIG. 2B is generally flat, while the substrate 102*a* is bent such that it is attached to the panel 200*b* at opposing ends of the substrate 102*a*, while a portion of the substrate 102*a* disposed therebetween extends away from the panel 200*b* into the cavity defined by the panel 200*b*.

Examples of suitable materials where a mesh construction is employed for the substrate 102 may generally be temperature resistant, e.g., to elevated temperatures that may occur in automotive paint bake ovens or during the process of forming expandable materials on the substrate 102. Examples of these material include, but are not limited to, nylon, wire, or glass-filled materials. Accordingly, a mesh substrate 102 may be a nylon, wire, or glass-filled mesh material.

Expandable insert 100*a* also includes a plurality of discrete expandable elements 104, e.g., that are expandable by application of heat. More specifically, and as shown in FIGS. 1, 2A, and 2B, expandable elements 104 may include a plurality of strips that are attached to substrate 102*a*. The plurality of discrete expandable elements 104 generally allows substrate 102 to be shaped to mimic an overall shape of panel 200 or to extend within the cavity, e.g., away from the panel 200. Any discrete number or shape of expandable elements 104 may be employed. Discrete expandable elements 104 may be formed of any expandable material that is convenient, e.g., an expandable baffle material which primarily absorbs sound transmission after expansion, a structural reinforcing material which provides structural reinforcement after expansion. Further, the expandable materials may be provided in combinations that include two or more varieties of expandable materials. Merely as examples, a thermoplastic, thermoset, or rubber material that is expandable or foamable may be employed. The expandable material(s) may be formed in any manner convenient, e.g., in an extrusion process. The expandable materials may also have any expansion ratio that is convenient, e.g., from a minimal ratio where expansion is very small, up to several thousand percent.

Figure 2C:
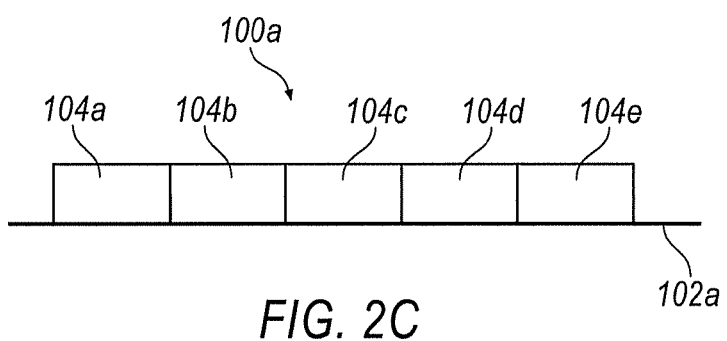
FIG. 2C is a plan view of the expandable insert of FIG. 1 in an initially straight configuration.
Figure 2D:
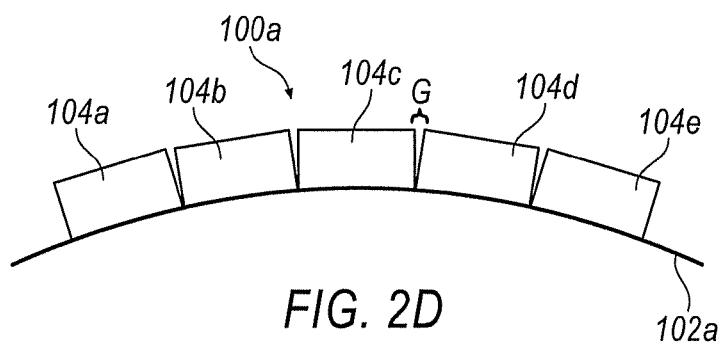
FIG. 2D is a plan view of the expandable insert of FIG. 1 in a deflected or bent configuration.

The discrete expandable elements 104 may be applied to generally preserve a flexibility of substrate 102, allowing the substrate 102 to be deflected, bent, or otherwise manipulated for installation in a given structure. Accordingly, the substrate 102*a* generally has a constant stiffness before and after application of the expandable elements 104 to the substrate 102*a*. As best seen in FIGS. 2A and 2B, the plurality of expandable elements are separately secured to the substrate 102*a*, with each expandable element in abutting contact or no contact relative to the other expandable elements. The expandable elements may thus generally freely allow selective deflection of the substrate and movement between the expandable elements to facilitate shaping the substrate 102*a* to a desired configuration for installation to a panel or structure. The plurality of discrete expandable elements 104 may each define a generally constant distance in relation to the other expandable elements 104 along a surface of the substrate. Further, the generally constant distance may be generally maintained when the substrate is deflected such that an absolute distance between the plurality of discrete expandable elements is modified. For example, as best seen in FIGS. 2C, expandable elements 104*a*, *b*, *c*, *d*, and *e* are each secured to the substrate 102*a* such that they are in abutting contact, e.g., with a relatively small or no gap between the expandable elements 104, when the substrate 102*a* is in an initially straight configuration. When the substrate 102*a* is deflected or bent as shown in FIG. 2D, the elements 104 each are manipulated with the portion of the substrate 102*a* to which they are secured, and gaps G are formed between the elements. An absolute distance between the elements 104 measured at a position on each of the discrete elements spaced away from the surface of the substrate by a predetermined magnitude, e.g., the gap G, may thus be modified as the substrate 102*a* is bent or deflected. At the same time, distance measured between the elements 104 measured along the surface of the substrate 102*a*, i.e., where the elements 104 are attached to the substrate, remains generally constant despite any manipulation of the substrate 102. Any influence of the elements 104 on a stiffness or flexibility of the substrate 102*a* may be substantially minimized, if not eliminated entirely, as a result of the independent securement of each element 104 to the substrate 102*a*. By comparison, the stiffness of a substrate having an expandable material that is applied across large portions or even the entirety of the substrate will be substantially affected by the application of the expandable material.

Discrete expandable elements 104 may be secured to substrate 102*a* by any known method. For example, expandable elements 104*a* may be applied to substrate 102*a* shortly after formation when expandable elements 104 are generally still flowable, and may be adhered to substrate 102. Alternatively, any known adhesive of other method of securing expandable elements 104 to substrate 102 may be employed. Conveniently, discrete expandable elements 104 may generally be secured to substrate 102 in a simplified manufacturing operation wherein the discrete elements 104 are generally applied to substrate 102 immediately after a thermoplastic forming process that creates discrete elements 104, e.g., an extrusion process.

The plurality of discrete expandable elements 104 may each have generally the same or different expansion rates. For example, a first one of discrete expandable element 104 may have a first expansion rate and may activate at a first temperature. A second discrete expandable element 104 may have a second expansion rate that is higher than the expansion rate of the first discrete expandable element 104. The second discrete expandable element 104 may additionally have a higher activation temperature. Accordingly, the expansion rate and activation temperature of each individual expandable element 104 may be similar or different to provide a specific shape of the foam that is expanded from discrete expandable elements 104. Expandable elements 104 may be expanded by any known process. For example, heat may be applied to expandable insert 100*a* to generally activate discrete expandable elements 104 and cause the expansion, e.g., in a paint bake oven associated with an automotive structure.

Figure 3:
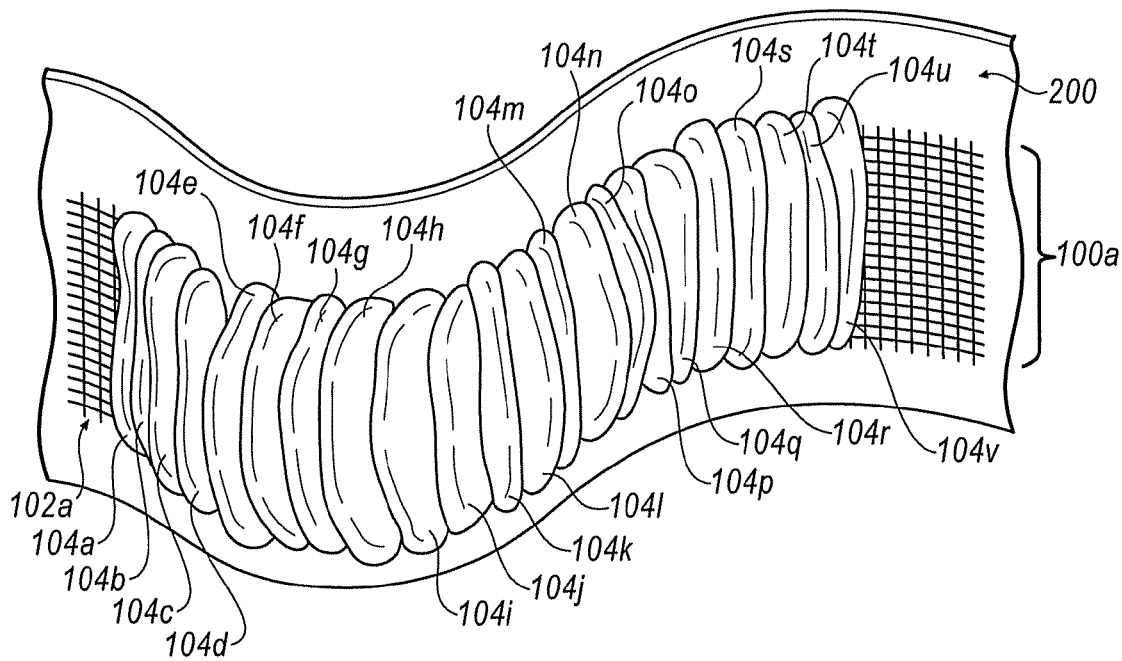
FIG. 3 is an isometric view of a expandable insert for a cavity having a plurality of strips of expandable material shown after expansion.

Turning now to FIG. 3, expandable insert 100*a* is shown with discrete expandable elements 104 after expansion. As shown in FIG. 3, the various discrete expandable elements 104 may each have similar or different expansion characteristics to provide a complex shape of the overall expanded insert. For example, discrete expandable element 104*a* expands to a smaller shape than element 104*b*. Any variety of expansion rates that are different or similar may be employed to create a desired overall shape of expandable insert 100*a* upon expansion. Two or more of the expandable elements 104 may expand to form a generally single expanded piece, i.e., such that the elements 104 are generally permanently joined together. Further, as shown in FIG. 3, the entire group of the plurality of expandable elements 104 may form a foam mass that is generally permanently formed as a single expanded piece. Upon expansion, the elements 104 may absorb vibrations transmitted through a cavity to which the expandable insert 100*a* is attached, and/or may reinforce the structure in which the expandable insert 100*a* is installed.

Figure 4:
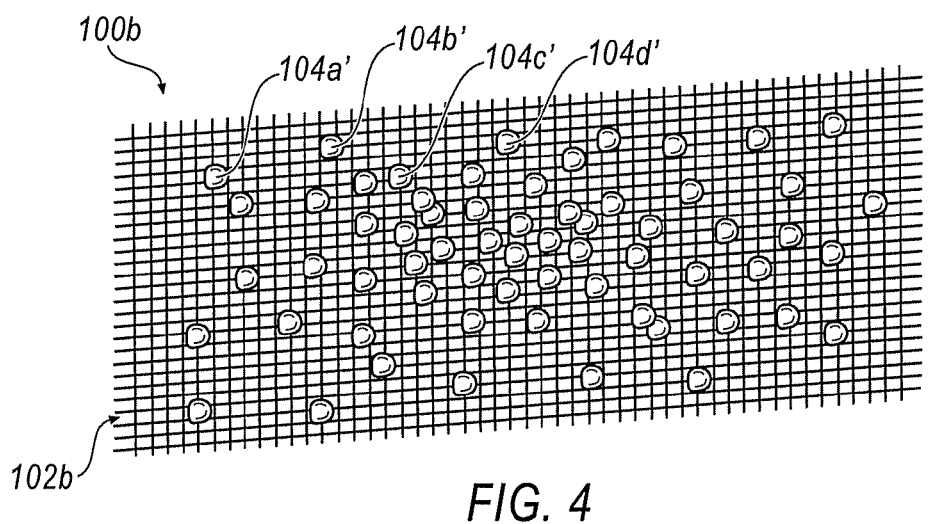
FIG. 4 is an isometric view of another exemplary expandable insert for a cavity having a plurality of discrete elements of expandable material shown prior to expansion.

Turning now to FIG. 4, another exemplary expandable insert 100*b* is shown. Expandable insert 100*b* includes a substrate 102*b* and discrete expandable elements 104*a*', 104*b*', 104*c*', etc. The discrete expandable elements 104' shown in FIG. 4 have a generally circular or spherical shape. The discrete elements 104' may be formed in the circular or spherical configuration shown by applying the elements 104' in a drop process where discrete amounts of expandable materials are dropped from an elevated position onto the substrate 102*b*. Accordingly, any shape or configuration of discrete expandable elements 104 may be used, allowing an unlimited variety of complex shapes to be formed according to the different shapes, sizes, activation temperatures, expansion rates, etc. of discrete expandable elements 104.

Figure 5:
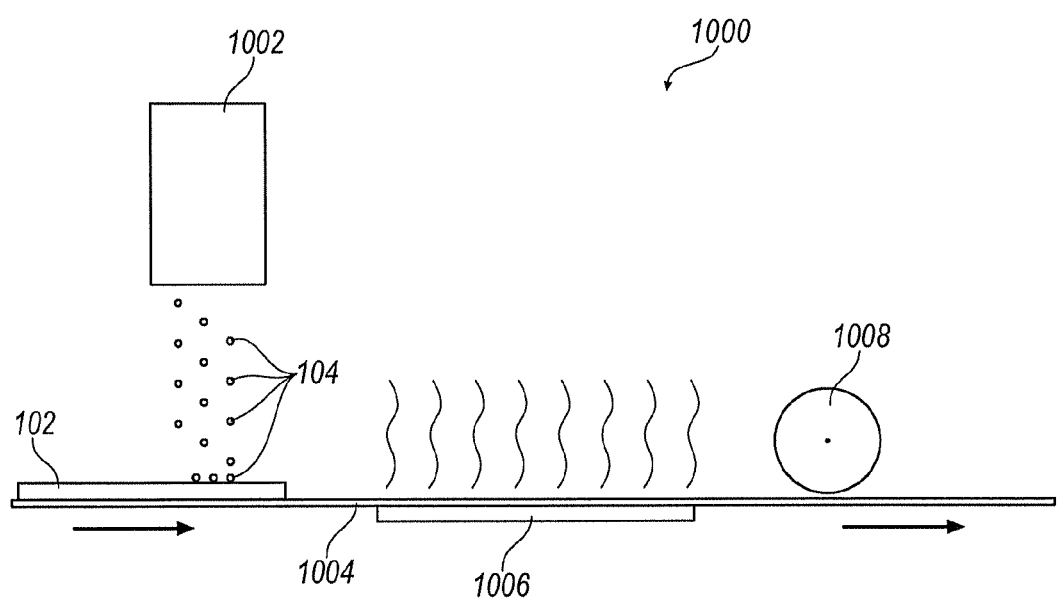
FIG. 5 is an exemplary illustration of a system for securing expandable elements to a substrate.

Turning now to FIG. 5, one exemplary illustration of a system 1000 for securing expandable elements 104 to a substrate 102 is shown. Expandable elements 104 are illustrated schematically here in a generally spherical form. While in this example the expandable elements are generally spherical in shape and have a diameter of 5-6 millimeters, any other size, shape or configuration of the expandable elements may be employed that is convenient, including the expandable elements 104 described above. The expandable elements 104 may be applied to a substrate 102 by being dropped from a hopper 1002. The substrate 102 may move along a conveyor 1004 and onto a heating plate 1006, which generally heats the substrate 102 and/or the expandable elements 104. The expandable elements 104 may then become softened, tacky, or otherwise amenable to being secured to the substrate 102, through the application of heat from the heat plate 1006. The substrate 102 may then travel underneath a roller 1008 which generally presses the expandable elements 104 onto the substrate 102. For example, where substrate 102 includes a mesh material, the roller 1008 may generally urge the expandable elements 104 against the substrate 102, thereby securing the elements 104 to the substrate 102 due to the softened and/or tacky state of the elements 104 from the heating process. The roller 1008 may be fowled of or coated with a non-stick material to prevent the roller 1008 from accumulating any of the expandable elements 104 as a result of any tackiness or softness of the elements 104 during the application process. The substrate 102 and/or expandable elements 104 may subsequently be allowed to cool such that the expandable elements 104 cure or are otherwise generally permanently fastened to the substrate 102.

In some examples, an adhesive may be applied to the substrate 102 on a side of the substrate generally opposite the expandable elements 104 to allow selective securement of the substrate 102, and in turn the expandable elements 104, to a desired structure. Adhesives may be provided in any manner that is convenient, e.g., by generally laminating an adhesive tape material onto the back of the substrate 102, or by applying an adhesive directly to the substrate 102. Other methods for securing the substrate 102 to a desired structure may be employed as well.

Expandable elements 104 may additionally be formed upon one another, and need not be applied directly to a substrate. For example, a substrate may have a first layer of expandable elements that have a given expansion rate and activation temperature. A second layer of expandable elements may be applied to a portion of or all of the first layer of expandable elements. The second layer of expandable elements may have a different activation temperature and/or expansion rate, providing additional flexibility to the formation of expanded material from the substrate.

Figure 6:
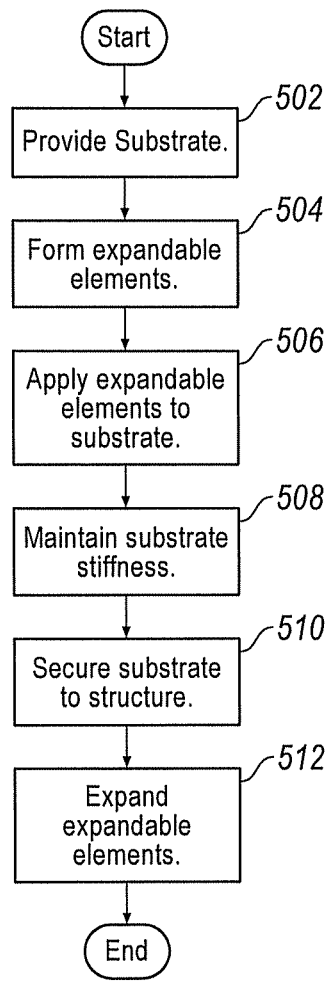
FIG. 6 is an exemplary process flow diagram for manufacturing an expandable insert.

Turning now to FIG. 6, a process 500 for forming an expandable insert is described. Process 500 may begin at step 502, where a substrate is provided. For example, as described above, substrate 102 may be any tape material, plastic, metal or fabric. Substrate 102 may be flexible or pliable such that it may generally be conformed to an overall shape of a structure 200 or to extend into the cavity away from interior surfaces of the structure 200. Process 500 may then proceed to step 504.

In step 504, discrete expandable elements 104 may be formed. For example, as described above, discrete expandable elements 104 may be formed in any thermoplastic forming operation. For example, discrete expandable elements 104 may be extruded or injection molded. Alternatively, as described above the expandable elements 104 may be applied in a drop application method where discrete amounts of expandable material, e.g., in a granular form, are dropped onto a substrate. Any other known forming process for expandable material may be employed. Process 500 may then proceed to step 506.

In step 506, discrete expandable elements 104 may be applied to substrate 102. For example, as described above, discrete expandable elements may be applied to substrate 102 generally shortly after formation of discrete expandable elements 104 when they are generally flowable or otherwise tacky so that they may generally be secured to the substrate 102. In one illustration, strips are applied directly to the substrate in an extrusion process. In another illustration, discrete amounts of expandable materials may be dropped onto a substrate and subsequently heated to secure the discrete expandable elements to the substrate. Any other mechanical method of fastening discrete expandable elements 104 to substrate 102 may be employed. Process 500 may then proceed to step 508.

In step 508, a substrate stiffness is established that remains generally constant before and after the plurality of discrete expandable elements are applied to the substrate. For example, as described above, expandable elements 104 may be applied in a manner that they do not significantly affect the stiffness or flexibility of the substrate, thereby allowing deflection, bending, or any other desired manipulation of the substrate for installation to a panel or structure. In one illustration, the elements 104 are in abutting contact or no contact, i.e., spaced away from each other, to allow selective movement between the elements 104 according to deflection of the substrate 102.

Proceeding to step 510, substrate 102 may be secured to a panel 200 or other structure. For example, as described above, substrate 102 may be generally conformed to a similar overall shape as structure 200 and may be secured with any known adhesive or other mechanical fastener. Alternatively, substrate 102 may be conformed to a shape other than that demonstrated by the structure or panel to which the substrate 102 is applied, such that substrate 102 may generally protrude into a cavity partially defined by structure 200. Process 500 may then proceed to step 512.

In step 512, discrete expandable elements 104 may be expanded. For example, heat may be applied to expandable elements 104, such as during a paint baking process or other known assembly process where heat is applied. Multiple elements 104 may expand together to form a single expanded element, i.e., that is permanently joined. Expandable elements 104 may generally expand at any pre-selected expansion rate and activation temperature that is convenient. Additionally, varying materials may be provided on a single substrate 102, with the materials defining different expansion rates, activation temperatures, shapes, sizes, etc. Accordingly, a wide array of potential shapes, sizes, and configurations of the expanded mass(es) may be formed by expandable elements 104. Process 500 may then terminate.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An expandable insert for a structure, comprising:
    a substrate configured to be secured to the structure, the substrate including a single monolithic piece extending along a portion of the substrate, the single monolithic piece having a stiffness allowing the single monolithic piece to deflect relative to an initial shape; and
    a plurality of discrete expandable elements secured to the substrate, each of the discrete expandable elements formed of an expandable material, wherein at least two of the plurality of discrete expandable elements extend along the single monolithic piece;
    wherein the at least two discrete expandable elements are secured to the substrate such that they do not affect the stiffness of the single monolithic piece prior to expansion of the expandable elements; and
    wherein the at least two discrete expandable elements are configured to form a single expanded element after expansion, the single expanded element extending along the single monolithic piece.

2. The expandable insert of claim 1, wherein at least two of the plurality of discrete expandable elements are configured to form a single expanded element after expansion.

3. The expandable insert of claim 1, wherein the substrate is configured to deflect to protrude from an installation surface of the structure that supports the substrate, such that the substrate extends away from the installation surface into a cavity defined at least partially by the structure.

4. The expandable insert of claim 1, wherein at least a portion of the plurality of expandable elements are in one of abutting contact and no contact relative to the other expandable elements, such that the expandable elements allow selective movement between the expandable elements according to deflection of the single monolithic piece.

5. The expandable insert of claim 1, wherein at least a portion of the plurality of discrete expandable elements are separately secured to the single monolithic piece such that the expandable elements each define a generally constant distance in relation to the other expandable elements along a surface of the single monolithic piece, and wherein the generally constant distance is maintained when the substrate is deflected such that an absolute distance between the plurality of discrete expandable elements is modified.

6. The expandable insert of claim 5, wherein the absolute distance is measured at a position on each of the discrete elements spaced away from the surface of the single monolithic piece by a predetermined magnitude.

7. The expandable insert of claim 1, wherein a first one of the plurality of discrete expandable elements has an expansion coefficient that is greater than an expansion coefficient of a second one of the plurality of discrete expandable elements.

8. The expandable insert of claim 1, wherein a first one of the plurality of discrete expandable elements has an activation temperature that is greater than an activation temperature of a second one of the plurality of discrete expandable elements.

9. The expandable insert of claim 1, wherein the expandable material is operable to expand upon application of heat.

10. The expandable insert of claim 1, wherein the expandable material is one of a baffle material operable to absorb vibrations transmitted through the structure and a structural reinforcing material operable to reinforce the structure.

11. The expandable insert of claim 1, wherein the expandable elements are extruded onto the substrate.

12. The expandable insert of claim 1, wherein the single monolithic piece of the substrate is configured to be selectively deflected generally freely to facilitate shaping the single monolithic piece of the substrate to a desired configuration for installation to the structure.

13. An expandable insert for a structure, comprising:
    a substrate configured to be secured to the structure, the substrate having a stiffness allowing the substrate to deflect relative to an initial shape; and
    a plurality of discrete expandable elements secured to the substrate, each of the discrete expandable elements formed of an expandable material;
    wherein the plurality of discrete expandable elements are secured to the substrate such that they do not affect the stiffness of the substrate prior to expansion of the expandable elements;
    wherein the substrate is one of a flexible tape and a mesh.

14. A structure, comprising:
    a wall defining at least a portion of a cavity, the wall including an installation surface;
    a substrate configured to be secured to the installation surface, the substrate including a single monolithic piece extending along a portion of the substrate, the single monolithic piece having a stiffness allowing the single monolithic piece to deflect relative to an initial shape; and
    a plurality of discrete expandable elements secured to the substrate adjacent the installation surface, each of the discrete expandable elements formed of an expandable material, wherein at least two of the plurality of discrete expandable elements extend along the single monolithic piece;

wherein the at least two discrete expandable elements are secured to the substrate such that they do not increase the stiffness of the single monolithic piece prior to expansion of the expandable elements; and wherein the at least two discrete expandable elements are configured to form a single expanded element after expansion, the single expanded element extending along the single monolithic piece.

15. The structure of claim 14, wherein the substrate is configured to deflect to protrude from the installation surface such that the substrate extends away from the installation surface into the cavity.

16. The structure of claim 14, wherein the substrate is one of a flexible tape and a mesh.

17. The structure of claim 14, wherein the expandable material is operable to expand upon application of heat.

18. The structure of claim 14, further comprising an adhesive disposed on the substrate on a side of the substrate opposite the expandable elements, the adhesive configured to secure the substrate to the installation surface.

19. The structure of claim 14, further comprising an adhesive disposed on the substrate on a side of the substrate opposite the expandable elements, the adhesive configured to secure the expandable elements to the structure.

20. The structure of claim 14, wherein the substrate is secured to the installation surface.

21. The structure of claim 14, wherein the single monolithic piece of the substrate is configured to be selectively deflected generally freely to facilitate shaping the single monolithic piece of the substrate to a desired configuration for installation to the installation surface.

22. An expandable insert for a structure, comprising:
a substrate configured to be secured to the structure, the substrate having a stiffness allowing the substrate to deflect relative to an initial shape; and
a plurality of discrete expandable elements secured to the substrate, each of the discrete expandable elements formed of an expandable material; and
an adhesive disposed on the substrate on a side of the substrate opposite the expandable elements;
wherein the plurality of discrete expandable elements are secured to the substrate such that they do not affect the stiffness of the substrate prior to expansion of the expandable elements.

23. The expandable insert of claim 22, wherein the adhesive is configured to secure the substrate to the structure.

* * * * *